United States Patent
Sims

[11] Patent Number: 5,904,440
[45] Date of Patent: May 18, 1999

[54] PISTON/PISTON ROD ASSEMBLY HAVING POSITIVE LOCKING MEANS BETWEEN SAID PISTON AND SAID PISTON ROD

[76] Inventor: James O. Sims, P.O. Box 1209, Decatur, Ala. 35603

[21] Appl. No.: 08/897,003

[22] Filed: Jul. 18, 1997

[51] Int. Cl.$^6$ ............................................. F16B 7/00
[52] U.S. Cl. .................. 403/316; 403/379.2; 403/379.5; 92/128
[58] Field of Search .................. 403/150, 151, 403/294, 378, 379, 316, 318, 13; 74/579 E; 92/128, 172

[56] References Cited

U.S. PATENT DOCUMENTS

| | | | |
|---|---|---|---|
| 1,440,801 | 1/1923 | Shoemaker | 403/348 |
| 2,355,538 | 8/1944 | Lane | 403/379 X |
| 3,065,734 | 11/1962 | Molzahn | 92/128 |
| 3,489,442 | 1/1970 | Wright | 403/355 X |
| 3,730,058 | 5/1973 | Siegel et al. | 92/128 |
| 3,808,956 | 5/1974 | Knapp | 92/172 |
| 3,994,604 | 11/1976 | Visser | 92/128 X |
| 4,767,233 | 8/1988 | Erickson | 403/378 X |
| 5,564,327 | 10/1996 | Sims | 74/579 E X |

FOREIGN PATENT DOCUMENTS

| | | | |
|---|---|---|---|
| 2484041 | 12/1981 | France | 92/172 |
| 781464 | 4/1979 | U.S.S.R. | 92/172 |
| 681234 | 8/1979 | U.S.S.R. | 92/172 |
| 1546734 | 2/1990 | U.S.S.R. | 92/172 |

*Primary Examiner*—Harry C. Kim
*Attorney, Agent, or Firm*—John C. Garvin, Jr.; Harold W. Hilton

[57] ABSTRACT

A piston/piston rod assembly. The piston is an annular member which is provided with a longitudinal bore therethrough having internal threads therein. A transverse opening is provided through the piston. The piston rod is provided with a threaded end for threaded engagement with the threaded portion of the piston. A transverse opening is provided through the piston rod. A pin is seated in the transverse openings of the piston and piston rod, responsive to assembly of the piston and piston rod, to retain the piston securely on the piston rod. The transverse openings are disposed to retain the pin therein to prevent movement of the piston on the piston rod, but yet allow a certain amount of adjustment of the piston relative to the piston rod during the assembly thereof.

11 Claims, 1 Drawing Sheet

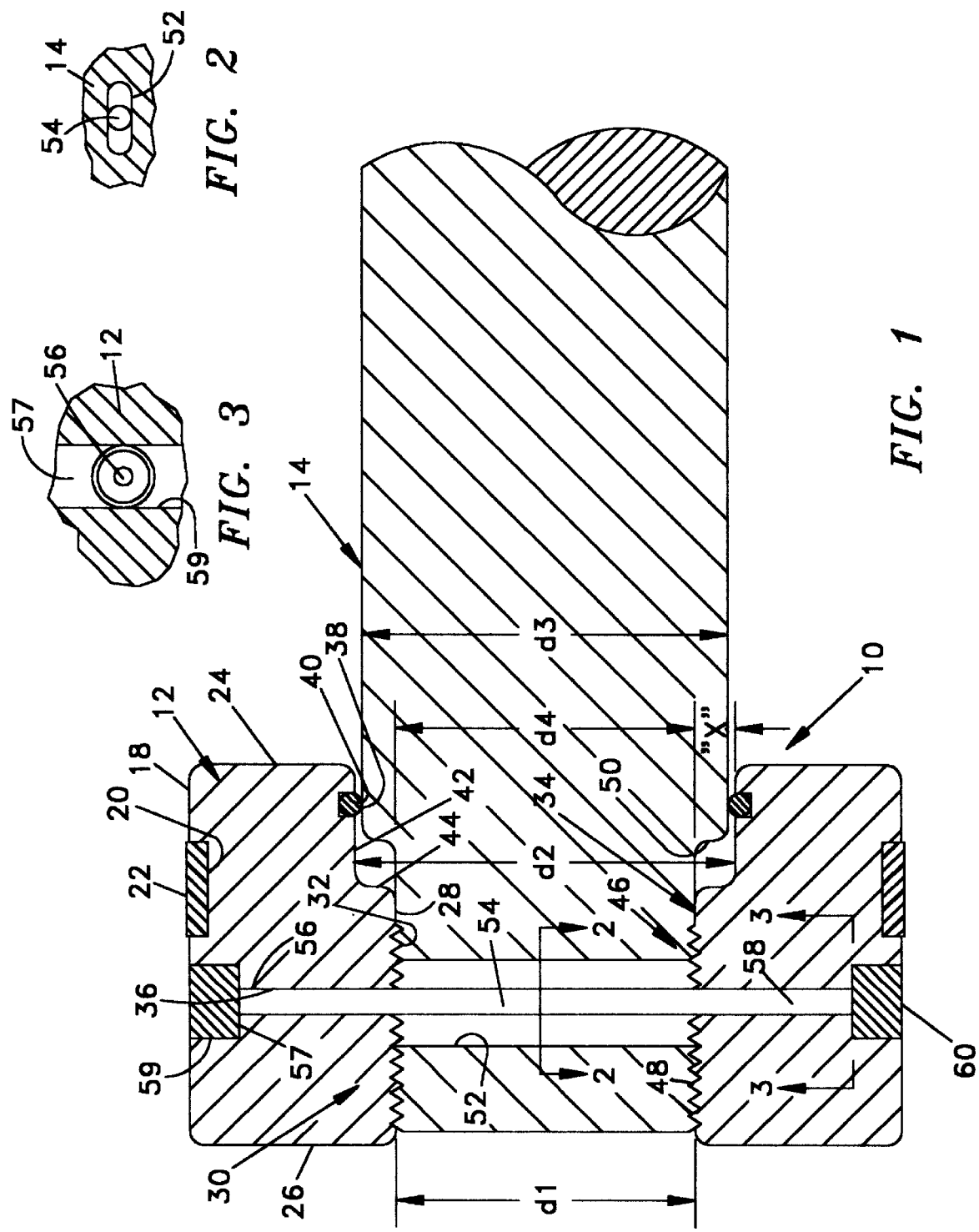

PISTON/PISTON ROD ASSEMBLY HAVING POSITIVE LOCKING MEANS BETWEEN SAID PISTON AND SAID PISTON ROD

FIELD OF THE INVENTION

This invention relates generally to a piston/piston rod assembly and more particularly to such a piston/piston rod assembly having a piston retaining member to positively secure the piston to the piston rod.

BACKGROUND OF THE INVENTION

Various piston/piston rod assemblies rely upon different methods of securing the piston to the piston rod to prevent the piston from becoming loose from the rod. One method is to construct the piston and rod of a single piece. However, such method of construction is costly both from a materials standpoint and from a time-consuming standpoint. The machining operation requires that a piece of stock be turned down to the diameter of the piston and that the stock material be further turned down (machined) to the diameter of the rod (two rods if the assembly is a double-acting piston/piston rod assembly). As can be appreciated, such machining is time consuming and expensive. Furthermore, a considerable amount of material must be machined off the stock piece to provide the two different diameters, e.g., piston and piston rod diameters. The loss of this material is costly.

Another less expensive method of producing a piston/piston rod assembly is to produce the rods and piston from separate size stock materials closely matching the desired size of the piston and rod so that less material will be wasted in the machining process. However, some means must be used in securing the piston on the piston rod. Typically, this involves the steps of externally threading an end of the piston rod and internally threading the piston member and then mating the two pieces. It has been found, however, that after considerable use, the piston tends to separate from the piston rod. One typical method of aiding in securing the threaded piston and rod together is to provide a layer of adhesive (such as LOCKTITE) to the threaded portions of the rod and piston. However, it has been found that these adhesives, when dry, tend to create small slivers which get into the system and act as an abrasive.

It has been further found that a typical threaded connection between the rod and piston requires that the rod be provided with a shoulder at the inner end of the rod and that the inner face of the piston be assembled in abutting relation against the should on the rod. Such structure makes it virtually impossible for the outer peripheral surfaces of the piston and piston rod to be parallel to one another and to the internal surface of the bore, since the threads on the ends of the rod and in the interior of the piston must be cut on angle. Because of this type of construction, a certain amount of cocking occurs. In an attempt to overcome this problem, it is necessary to apply a very high torque to the rod and piston when assembling the two members. Such high torque unnecessarily stresses both the rod and piston material and consequently lowers the strength of the material.

BRIEF DESCRIPTION OF THE DRAWINGS

FIG. 1 is an elevational sectional view of the piston/piston rod assembly of the present invention.

FIG. 2 is a sectional view of the opening through the piston rod as seen along line 2—2 of FIG. 1.

FIG. 3 is a sectional view taken along line 3—3 of FIG. 1.

DESCRIPTION OF THE PREFERRED EMBODIMENT

As seen in FIG. 1, a piston/piston rod assembly 10 includes a piston 12 and a piston rod 14. Piston 12 is shown to include an outer peripheral surface 18 having an annular groove 20 to receive a seal 22 therein. The piston further includes inner and outer faces 24 and 26, respectively, and a bore 28 extending therethrough. A threaded portion 30 of the piston bore 28 is provided with a plurality of internal threads 32 on the inner surface 34 of bore 28. The bore 28 of piston 12 is provided with a diameter designated by the letter $d_1$. A hole 36 is provided transversely across the piston. A seal 38 is carried in an annular groove 40 provided in the inner surface of bore 28 and adjacent to the inner face 24 of the piston. The piston is shown to be provided with a cut-away portion 42 forming a shoulder 44 and having a diameter $d_2$.

The piston rod 14 is shown to be comprised of a single member which includes a threaded portion 46 defined by external threads 48 disposed for threaded engagement with the internal threads 32 of the piston. Piston rod 14 is provided with an external diameter $d_3$ and is cut away adjacent to the threaded portion thereof to form a shoulder 50 and a diameter $d_4$. A hole 52 is provided transversely across the piston rod. The hole 52 of the piston rod is provided with a larger diameter than the hole 36 of the piston for reasons explained hereinbelow.

To assembly the piston to the piston rod, it is only necessary to screw the piston onto the rod until holes 36 and 52 are aligned. No torquing is required. Once the holes 36 and 52 are in alignment, a pin 54 having a first end 56 and a second end 58 is inserted into the holes 36 and 52 to positively lock the piston to the rod. The ends 56 and 58 of pin 54 are disposed adjacent to an annular surface 57 provided in the bottom of an annular groove 59 which is disposed around the outer circumferential surface of the piston. A retaining member 60 which may be a piston seal or wear band is positioned in the annular groove 59. Member 60 serves as a piston seal or wear band and also as a retainer for retaining the pin 54 in place.

FIG. 2 is a sectional view taken along line 2—2 of FIG. 1 and illustrates the transverse hole 52 of the piston rod as being elongated.

FIG. 3 is a sectional view taken along line 3—3 of FIG. 1.

As can be seen from the foregoing, the applicant has provided a piston/piston rod assembly wherein the piston and piston rod are easily assembled without need of torquing, thus eliminating the need for expensive torquing equipment. Applicant's assembly is accomplished by securing the piston 12 to the piston rod 14 by pin 54, and the pin 54 is retained by retaining member 60 which may be a seal or wear band. The retaining member is easily removable whereby the pin may be removed to disassemble the device or to permit the piston to be moved (rotated) forward or aft on the piston rod for fine adjustment of the piston on the rod prior to replacing the pin and retainer. The larger opening in the piston rod permits a small amount of axial adjustment (movement) of the piston on the rod. This amount of movement may be equal to (in the case of the circular hole) the diameter of the hole in the piston rod minus the diameter of pin 54. In the case of the elongated hole, the amount of adjustment may be equal to the length of the elongated hole in the piston rod minus the diameter of the piston rod.

In applicant's assembly, no locking fluids (LOCKTITE, etc.) are used or required, thereby eliminating the possibility of flakes (slivers) of the hardened fluids entering the system. Furthermore, the assembly is easy to repair, and no heat is required to separate the parts. There are no stressed areas on the rod or piston since no torque has been applied to the parts and, the assembly enables the piston to truly ride the pitch diameter.

In addition to the foregoing, the structure of the present invention permits longer pistons to be used in the actuator assembly since the axes of the piston and piston rod are parallel. The use of longer pistons eliminates the need for stop tubes as are used in some typical actuator assemblies. Such stop tubes are generally used to maintain alignment of the rod in the cylinder and to minimize pressure on the piston and rod bearing.

It is to be understood that while the piston rod and piston are shown and described as having an externally threaded and internally threaded areas, and these threaded areas extend substantially the length of the bore in the piston, the claims are not limited to such structure. For example, the threaded areas on the rod and in the bore of the piston may extend along the rod and in the bore for only a portion of the distance shown in FIG. 1. Also, it is to be understood that while the pin is shown to be extending through the threaded areas, this is not to be construed in a limiting sense since the pins may be positioned adjacent to either of the ends of the threaded area and not necessarily the threads themselves.

I claim:

1. A piston/piston rod assembly comprising:
   an annular piston having a bore longitudinally therethrough, said bore having a threaded area wherein at least a portion of the internal surface of said bore is provided with threading thereon, and a transverse passage extending through and opening on opposite sides of said piston;
   a piston rod comprised of a single elongated member, said piston rod having a threaded end and an unthreaded body portion for threaded engagement with said internally threaded bore of said piston, said piston rod having a transverse passage extending therethrough and opening through opposite sides of said piston; and
   a pin disposed in said transverse passages of said piston rod and piston for secured relation therebetween, said pin preventing rotation of said piston on said piston rod, whereby longitudinal movement of said piston on said rod is also prevented said piston being provided with an annular groove on the outer surface thereof, said annular groove having a bottom surface therein, said pin having a pair of ends, and said ends of said pin being positionable adjacent to said bottom annular surface of said annular groove.

2. A piston/piston rod assembly as in claim 1 wherein said annular groove extends around the circumference of said piston, said annular groove having a pin retaining member positioned therein in engaged relation with said end of said pin for retention thereof in said transverse passage.

3. A piston/piston rod assembly as set forth in claim 2 wherein said pin retaining member is a piston seal.

4. A piston/piston rod assembly as in claim 2 wherein said transverse passage in said piston rod is provided with a larger diameter than the transverse passage in said piston.

5. A piston/piston rod assembly as in claim 4 wherein said threaded end of said piston rod is provided with a diameter less than said diameter of the unthreaded body portion of said piston rod whereby a shoulder is formed at the juncture of said threaded and unthreaded portions of said rod.

6. A piston/piston rod assembly as set forth in claim 2 wherein said pin retaining member is a wear band.

7. A piston/piston rod assembly comprising:
   an annular piston having a bore longitudinally therethrough, said bore having a threaded area wherein at least a portion of the internal surface of said bore is provided with threading thereon, and a transverse passage extending through and opening on opposite sides of said piston, said piston having an annular groove on the outer surface thereof, said groove having bottom surface;
   a piston rod having a threaded end portion for threaded engagement with said internally threaded bore of said piston, said piston rod having a transverse passage extending therethrough and opening through opposite sides of said piston; and
   a pin disposed in said transverse passages of said piston rod and said piston for secured relation therebetween, said pin having a pair of ends, and said ends being positionable adjacent to said bottom annular surface of said annular groove of said piston, said pin disposed for preventing rotation of said piston on said piston rod, whereby longitudinal movement of said piston rod is also prevented, said transverse passage in said rod being provided with a larger diameter than the transverse passage in said piston.

8. A piston/piston rod assembly as in claim 7 wherein said threaded end portion of said piston rod is provided with a diameter less than the diameter of an unthreaded body portion of said piston rod whereby a shoulder is formed at the juncture of said threaded and unthreaded portions of said rod.

9. A piston/piston rod assembly as in claim 8 wherein an annular pin retaining member is positioned in said annular groove for engaged relation with said ends of said pin for retention thereof in said transverse passages.

10. A piston/piston rod assembly as in claim 9 wherein said pin retaining member is a piston seal.

11. A piston/piston rod as in claim 9 wherein said pin retaining member is a wear and.

\* \* \* \* \*